Nov. 26, 1963    E. M. GREEN    3,111,955
CAMPING OUTFIT FOR USE WITH ROAD MOTOR VEHICLES
Filed Jan. 19, 1962    3 Sheets-Sheet 1
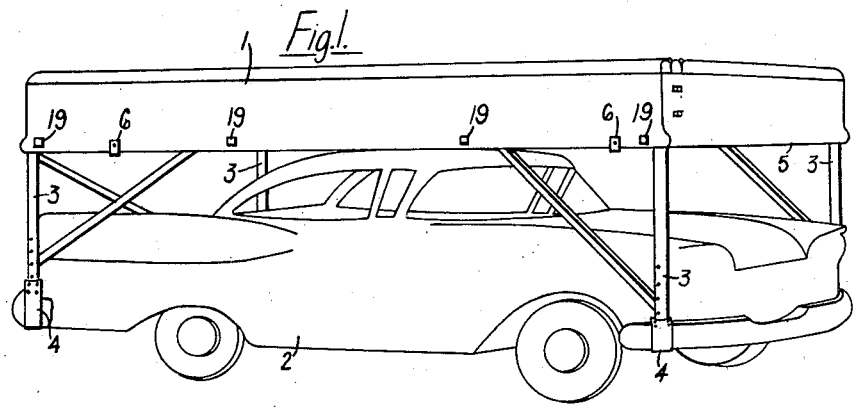
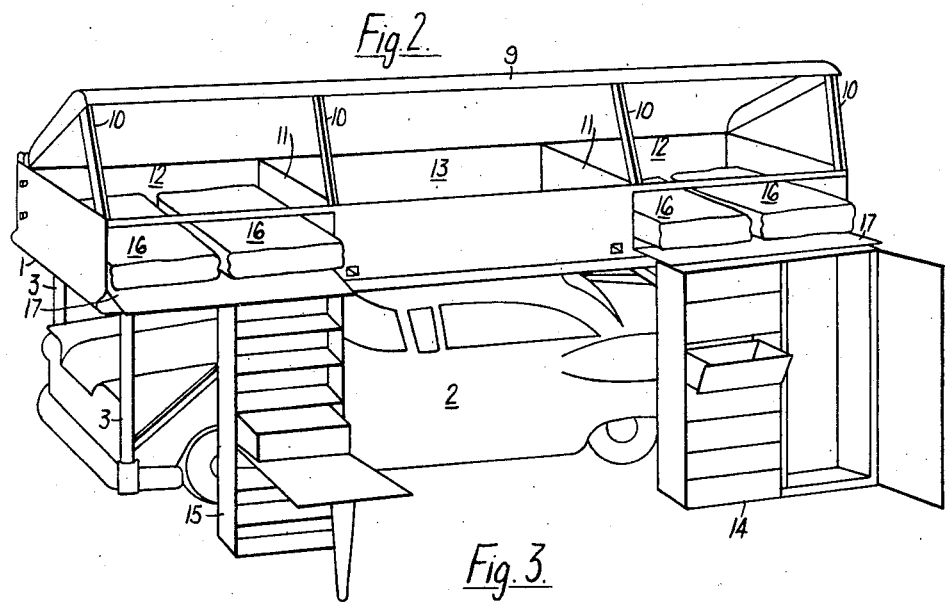
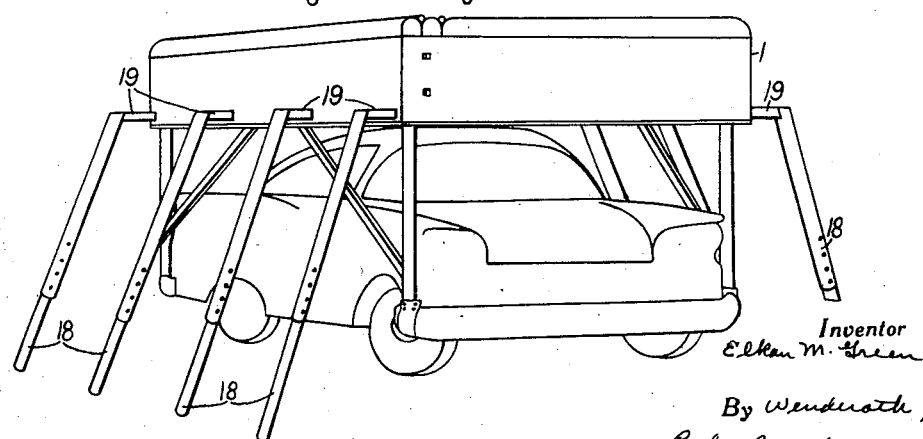
Inventor
Elken M. Green
By Wendroth,
Lind & Ponack, Attorneys

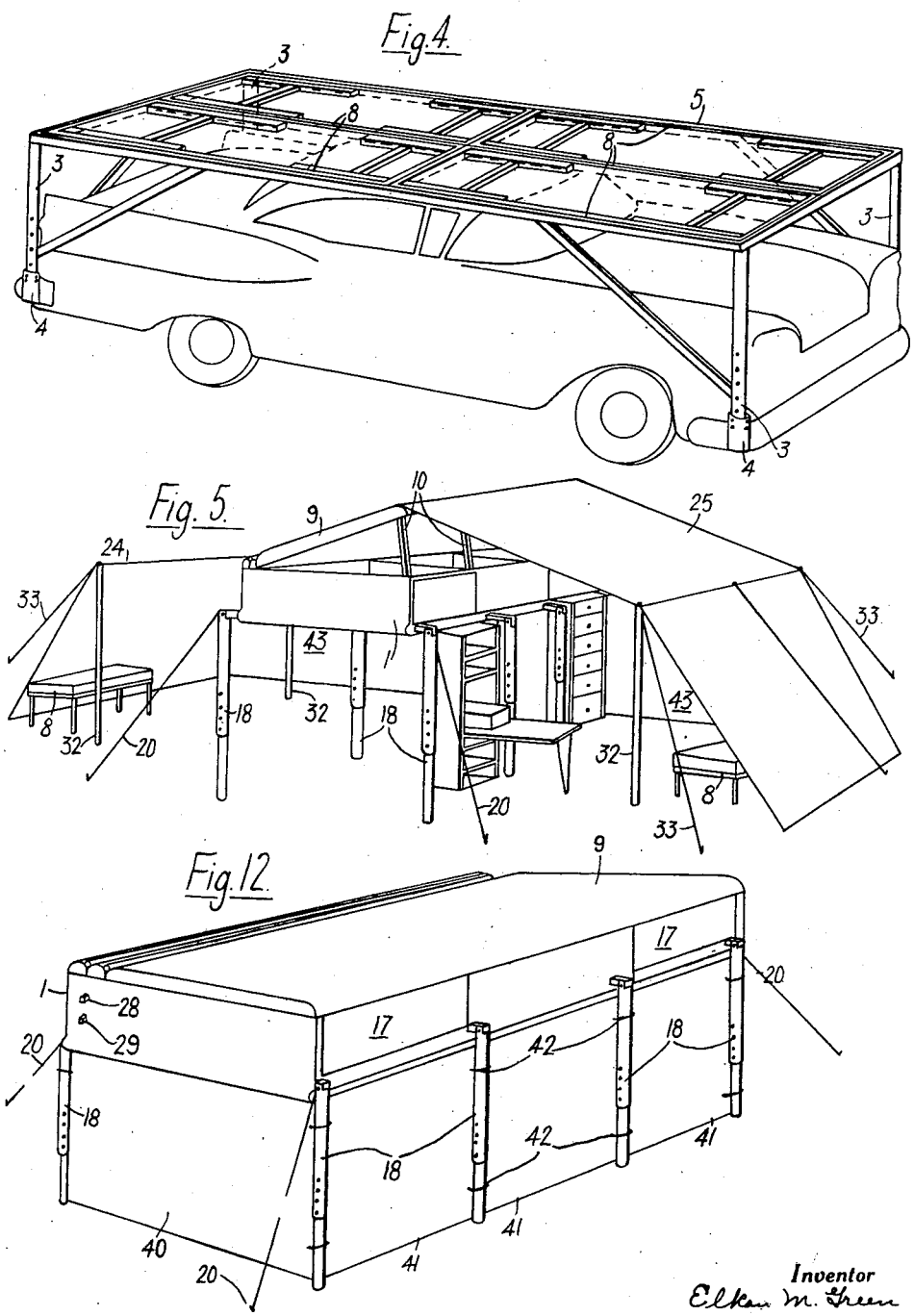

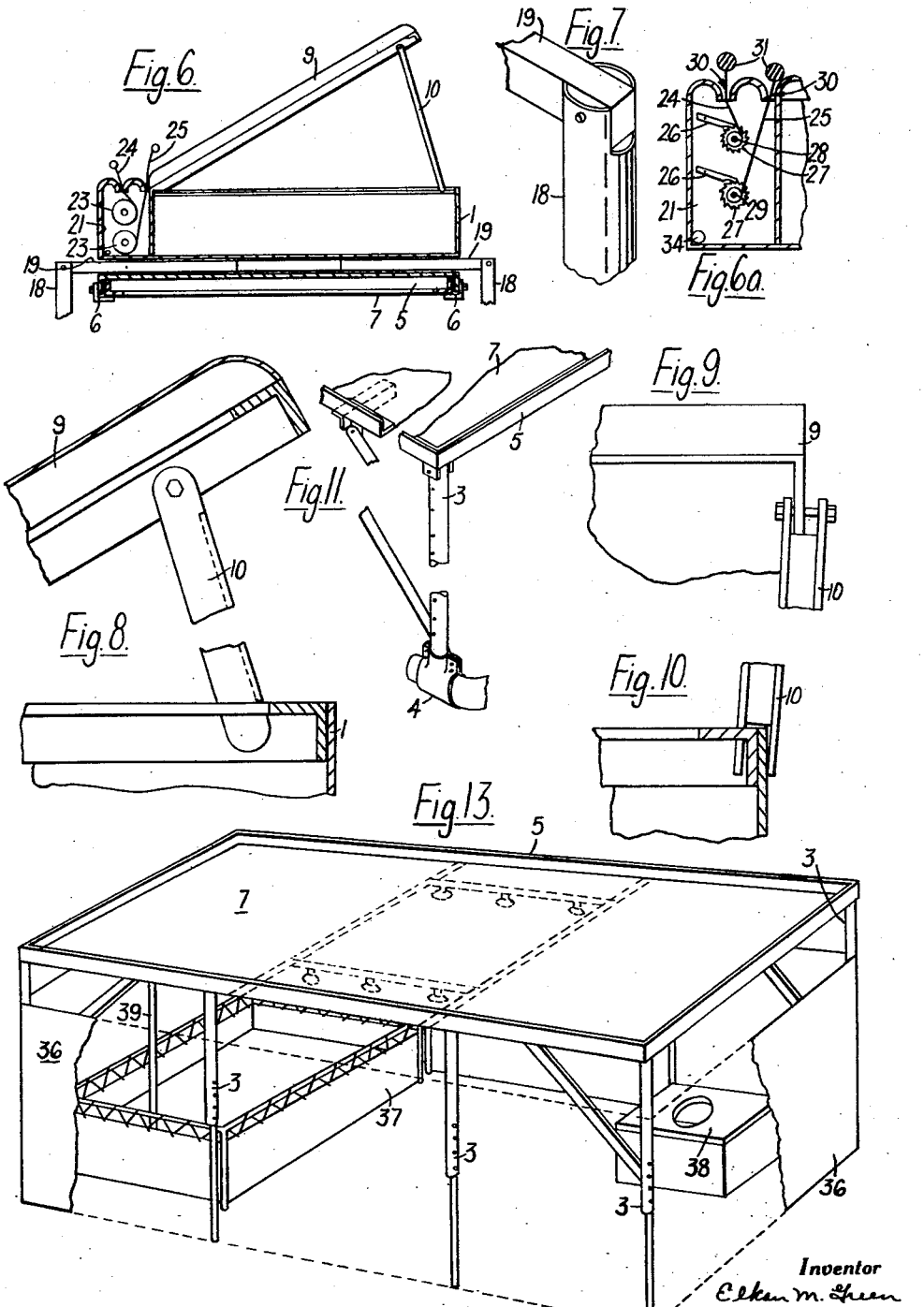

United States Patent Office 3,111,955
Patented Nov. 26, 1963

3,111,955
CAMPING OUTFIT FOR USE WITH ROAD
MOTOR VEHICLES
Elkan M. Green, 161 N. Ridge Road, Durban, Natal,
Republic of South Africa
Filed Jan. 19, 1962, Ser. No. 167,230
Claims priority, application Republic of South Africa
Jan. 24, 1961
12 Claims. (Cl. 135—1)

This invention relates to a camping outfit adapted for use with road motor vehicles such as passenger cars of the usual sedan type, panel vans, estate cars, trucks and jeep-type vehicles as well as trailers.

An object of the invention is to provide a camping outfit which will take the place of the usual caravan and which can be easily stored, say in a garage, when not in use. The application can be extended for military purposes, the use of commercial travellers for the carrying of samples, tradesmen for effecting deliveries, artisans for their tools and equipment, geologists in the field and hawkers for the display of their wares at roadsides.

According to the invention, a camping outfit for use with a road vehicle includes, a box structure adapted to be removably supported above the roof of such vehicle by means of a rigid supporting carrier frame having uprights which are attachable to fore and aft parts of the vehicle chassis or its bumpers, which box structure is provided with a hinged weatherproof lid, sleeping and storage compartments and roll-up canvas or like tent sheets adapted, when drawn out, to provide lean-to covered living spaces on either side of such box structure, which is arranged to be supported in an elevated position, independently of the vehicle by means of ground-engaging uprights and guy ropes, and thereby enabling the vehicle to be driven out from beneath it and used for normal purposes after the camping site has been reached.

The box structure is preferably of rectangular shape and is removably supported on the similarly shaped carrier frame both of which preferably extend substantially the full length of the vehicle just clear of the roof thereof but capable of being additionally supported thereby.

A feature of the invention is that this carrier frame is arranged to carry a plurality of foldable bed frames which are located within the frame members thereof, so as not to interfere with the supporting of the box structure on such carrier frame. The bed frames are thus hidden from view but can be removed and used beneath the covered area, which in effect constitutes a tent-like structure. The bed frames are preferably of the kind in which pairs of head and foot legs are adapted to fold inwardly flush with the side frame members in the collapsed position, so that the storage space required for them is in depth equal to the depth of such side frame members.

Preferably sheet material such as aluminium is fixed across the carrier frame members so as to provide a shallow downwardly recessed space for the stowage of the foldable bed frames.

The interior of the box structure is preferably divided by partitions into several suitable compartments, some or all of which are arranged to be used as sleeping bunks and, when not used as such, provide storage space for mattresses, bedding, articles of furniture and other camping paraphernalia, or when being used for commrecial purposes to house carriers or display shelves for merchandise. These are suitable for use as weather and dust-proof roof carriers for suitcases or other articles.

The interior of the box structure in a preferred construction is divided by partitions, one to form a channel extending the full length of the box structure along one side and, others extending transversely of the remaining space to provide the sleeping and stowage compartments, and wherein the lid is hingedly mounted along the longitudinal partition and the front side is provided with suitable props to hold the lid open and provide access to the interior thereof from this front side such as by means of a short ladder. This front side of the box structure is provided with a plurality of hinged downwardly opening side wall closure flaps which facilitate the stowage in, and removal of articles from the several compartments and which can be so fixed as to provide extra length for the bunks.

Two tent sheets are provided which are arranged to be rolled up each on a separate roller, which rollers are rotatably mounted in the box-like channel arranged along the rear side of the box structure. This box-like channel may be made watertight so that it can be used as a reservoir for collecting rain water draining off the tent sheets when these are erected. One or both of the tent sheets may be raised temporarily to provide increased rain water collecting means adapted to drain into the said reservoir. A pawl and ratched mechanism is associated with each tent sheet roller and means such as a cranked handle is provided to rotate each roller.

For the sake of lightness, the carrier frame and its uprights are preferably made from aluminium sections. Means such as bolts, clips or the like are provided to secure the box structure to the carrier frame during travelling.

To enable the invention to be more clearly understood and carried into practice, reference is now made to the accompanying drawings in which like references denote like parts throughout the several views:

In the drawings:

FIGURE 1 is a pictorial view of a camping outfit made according to the invention, and shown mounted for travelling on a sedan type motor vehicle;

FIGURE 2 is a side pictorial view showing the camping outfit of FIGURE 1 partly opened for use while still supported on the vehicle.

FIGURE 3 is a view similar to FIGURE 1, but showing how the box structure is raised so as to be supported independently of the vehicle;

FIGURE 4 is a pictorial view showing the vehicle and carrier frame after the car has been driven out from beneath the box structure when it has been elevated in the manner shown in FIGURE 3;

FIGURE 5 is a pictorial view showing the camping outfit in its fully erected condition.

FIGURE 6 is an end sectional view of the box structure with the lid in its open position.

FIGURE 6a is a fragmentary end sectional view of the tent sheet channel showing the pawl and ratched wheel arrangement, and drawn to an enlarged scale;

FIGURE 7 is a fragmentary enlarged pictorial view showing the connection between an upright and a slidable fitting of the box structure;

FIGURE 8 is a fragmentary enlarged view showing arrangement and construction of a lid prop when in the operative position;

FIGURE 9 is an end view taken on FIGURE 8 showing connection of the top end of a lid prop;

FIGURE 10 is an end view taken on FIGURE 8, showing engagement of the bottom end of the lid prop with an edge of the box structure;

FIGURE 11 is a fragmentary pictorial view of one corner of the carrier frame showing method of supporting it on a bumper of the vehicle;

FIGURE 12 is a pictorial view showing a modified arrangement in which rigid wall flaps partly enclose the space beneath the box structure when supported on its uprights; and FIGURE 13 is a pictorial view showing use of the carrier frame and its uprights to provide a separate structure capable of being used as a bathroom and lavatory.

FIGURE 1 of the drawings shows the box structure 1 mounted on a standard type of sedan motor vehicle 2 by means of four tubular telescopic uprights 3 which have their bottom ends fixed to the front and rear bumpers by clamps 4, and their ends fixed to the corners of a rectangular carrier frame 5 (more clearly shown in FIGURE 4) on which the bottom of the box structure 1 rests as illustrated in FIGURE 6. Four angle clips 6 are used to clamp the box structure 1 to the carrier frame 5 which is made from angle sections as shown and is closed as regards its bottom side by sheet material 7 such as aluminium so as to form a shallow recess in which four folding bed frames 8 can be accommodated as shown in FIGURE 4.

FIGURE 2 illustrates the use of the clamping outfit when, say, a one night stop is made. In this case, the lid 9 is partly opened and held in such open position by four props 10 to enable access to be had to the interior of the box structure 1 which is divided by two partitions 11 into two end compartments 12 and a middle compartment 13. During travelling, the end compartments house the wardrobe unit 14 and the wash basin and shelf unit 15, while the middle compartment takes the four mattresses 16 which as shown are placed in the end compartments 12 to provide sleeping bunks. The front sides of the end compartments 12 are arranged to be closed by hinged flaps 17 which as shown can be supported on the top ends of the units 14 and 15, whereby the bunks can be extended. When a longer stay is to be made the box structure 1 is removed from the carrier frame 5. To enable this to be done, eight telescopic uprights 18 have their top ends connected by pins or bolts to the ends of the slidably housed support fittings 19 which are drawn out of their guide recesses as shown in FIGURES 3, 6 and 7. After loosening the clips 6, the uprights 18 in turn are pushed inwardly to vertical positions whereby the box structure is raised sufficiently to enable the vehicle to be driven out from beneath the box structure which is then wholly supported by these uprights in the manner illustrated in FIGURE 5. Prior to this operation, guy ropes 20 are fixed in position to steady the erected structure.

The rear side of the box structure 1 is constructed to provide a box-like channel 21 in which two rollers 22 and 23 are rotatably mounted by their ends in bearings in the end walls of this channel 21 as shown in FIGURES 6 and 6a. The rollers 22 and 23 have tent sheets 24 and 25 rolled thereon and pawls 26 coacting with ratchet cogs 27 keyed to the roller shafts 28 and 29 enable these tent sheets to be drawn taut after their ends have been secured to the ground by tent pegs as shown in FIGURE 5. These tent sheets are drawn off the rollers 22 and 23 through slot openings 30 in the top side of the channel 21. The ends of the tent sheets 24 and 25 are provided with stop bars 31 which prevent them from being drawn through the slot openings 30. Side walls 43 of canvas or like tent sheets can be secured by clips, hooks or cord to the sheets forming the lean to roof and to the telescopic uprights 18.

FIGURE 5 shows how these two tent sheets provide additional lean-to shelters by the use of tent poles 32 and guy ropes 33. Rotation of the roller shafts 28 and 29 which project through an end wall of the channel 21, is conveniently effected by means of a crank handle adapted to engage such projecting ends such as by providing a square formation on each of such ends. At one end an outlet opening 34 provided with a plug is included to run off rain water which collects in the channel 21. As shown in FIGURE 6, the box structure 1 is located on top of the carrier frame 5 by a downwardly directed flange 1a, projecting downwardly from the bottom edge of the box structure, which engages over the upwardly projecting angle-sectioned members 5a of the carrier frame 5 and is secured thereto by the clips 6.

If an additional roofed structure is required to act, say, as a bathroom and lavatory, the clamps 4 are loosened and the carrier frame 5 together with its telescopic uprights 3 are removed from the vehicle and erected as shown by FIGURE 13. The sides may be wholly or partly closed in by canvas or like sheeting 36. Shown in this view is a canvas bath 37 and privy 38. The carrier frame 5, owing to its recessed formation, will act as rain water collecting means and a run-off pipe or hose 39 may be arranged to lead such water into the bath 37 or into any other convenient receptacle as required.

FIGURE 12 illustrates a modified construction of the box structure 1 in which end wall flaps 40 and side wall flaps 41 of suitable sheet material, such as hardboard or aluminium, are hingedly attached to the bottom of the box structure 1 so that for travelling they are capable of being folded in overlapping relationship with one another against the underside of the bottom of the box structure. In their downwardly depending operative positions these wall flaps are secured to the uprights 18 by clamps or lengths of cord 42. In this way a closed living space is provided beneath the box structure 1. The wall flaps can be fitted with windows of perspex or like unbreakable material to provide light and/or ventilation.

Although the invention has been described and illustrated for attachment to a sedan type road motor vehicle, the box structure may also be fitted to a trailer vehicle by the uprights 3. In this case, the space beneath the box structure may be used for carrying a boat, camping gear or other articles.

The box structure may of course be arranged to be carried on other types of vehicles, such as panel vans, estate cars, trucks as well as Jeep-type vehicles.

I claim:

1. A camping outfit for use with a road motor vehicle, said camping outfit comprising an elongated rectangular box structure for providing sleeping accommodations, a rigid carrier frame on which said box structure is removably mounted and having uprights depending therefrom and adapted to be attached to fore and aft parts of the vehicle such as its bumpers for supporting the box structure above the roof of the vehicle with its longitudinal axis parallel with the longitudinal axis of the vehicle, a weatherproof lid for the box structure hingedly attached thereto with the hinge axis extending longitudinally of the box, ground-engaging uprights and guy ropes connectible to said box structure for supporting the box structure clear of the vehicle to enable the vehicle to be driven out from beneath the box structure, an elongated box-like channel on said box structure outwardly of and parallel with the hinge axis of the lid, a pair of rollers located in and extending along the length of said channel and rotatably mounted therein, and a tent sheet rolled on each roller and which tent sheets are adapted to be drawn off the rollers to provide lean-to living spaces, one on either side of the box structure, one of said tent sheets passing over the lid when drawn off the roller, and the carrier frame being of shallow downwardly recessed construction and the box structure being supported on the top edges thereof so as to leave a shallow space between the bottom side of the box structure and the bottom side of the carrier frame, whereby said shallow space can be used for stowage space for a plurality of foldable bed frames.

2. A camping outfit as claimed in claim 1, wherein such carrier frame and the box structure extend substantially the full length of the vehicle.

3. A camping outfit as claimed in claim 1, wherein wall flaps are hingedly attached along at least one side and the two ends of the box structure at the bottom thereof, whereby the wall flaps, after the box structure has been supported on its uprights, can be swung downwardly to enclose a living space for which the box structure forms the roof.

4. A camping outfit as claimed in claim 1, wherein the box structure has a plurality of transverse partitions therein dividing said box structure into a plurality of compartments, at least some of which are adapted to be sleeping bunks.

5. A camping outfit as claimed in claim 1, in which said box structure has support fittings mounted in spaced relationship along the two opposite sides of the box structure, the ground-engaging uprights for supporting the box structure in an elevated position having their top ends coacting with said support fittings.

6. A camping outfit as claimed in claim 1, wherein the box-like channel for locating the tent sheet rollers is watertight for collecting rain water draining off the tent sheets when the tent sheets are drawn out of said box-like channel and suitably erected.

7. A camping outfit as claimed in claim 1, and further comprising a pawl and ratchet mechanism coupled with each tent sheet roller, and handle means removably mounted on said rollers to rotate each roller.

8. A camping outfit as claimed in claim 1, wherein the sides and bottom of the said stowage space are lined with suitable sheet material such as aluminum, whereby when the carrier frame is removed from the vehicle and supported on its uprights it is capable of providing a separate weatherproof structure.

9. A camping outfit as claimed in claim 8, wherein the uprights of the carrier frame are of telescopic form, and wall flaps attachable to said carrier frame, whereby the frame can be erected clear of the vehicle and have the wall flaps placed thereon to provide a covered enclosed space suitable for use as kitchen, bathroom and lavatory or the like.

10. A camping outfit as claimed in claim 4, wherein the free side of the lid of the box structure has a plurality of props thereon adapted to depend therefrom to hold the lid in a partly open position so as to provide access to the interior.

11. A camping outfit as claimed in claim 10, wherein the side of the box structure opposite the side on which said lid is hinged has a plurality of hinged downwardly opening side wall closure flaps, facilitating access to the compartments, and means on said outfit for fixing said closure flaps in a horizontal position to provide extra length for the sleeping bunks.

12. A camping outfit as claimed in claim 5, wherein said support fittings are straight elements and the bottom of said box structure has horizontal guide recesses therein in which said support fittings are slidably mounted, said uprights having a telescopic construction.

References Cited in the file of this patent
UNITED STATES PATENTS

| | | |
|---|---|---|
| 667,475 | Winter | Feb. 5, 1901 |
| 2,291,900 | Jimmes | Aug. 4, 1942 |
| 2,710,977 | Fannin | June 21, 1955 |
| 2,714,524 | Swiggum | Aug. 2, 1955 |
| 2,917,059 | Emanuelson | Dec. 15, 1959 |
| 2,995,397 | Eames | Aug. 8, 1961 |